(12) United States Patent
Matute

(10) Patent No.: US 10,630,669 B2
(45) Date of Patent: Apr. 21, 2020

(54) METHOD AND SYSTEM FOR USER VERIFICATION

(71) Applicant: Diego Matute, Kanata (CA)

(72) Inventor: Diego Matute, Kanata (CA)

(73) Assignee: Cyphercor Inc., Kanata (CA)

( * ) Notice: Subject to any disclaimer, the term of this patent is extended or adjusted under 35 U.S.C. 154(b) by 240 days.

(21) Appl. No.: 15/700,553

(22) Filed: Sep. 11, 2017

(65) Prior Publication Data

US 2018/0077133 A1    Mar. 15, 2018

Related U.S. Application Data

(60) Provisional application No. 62/385,619, filed on Sep. 9, 2016.

(51) Int. Cl.
*H04L 29/06* (2006.01)
*H04L 9/32* (2006.01)
*H04W 4/14* (2009.01)
*H04W 12/06* (2009.01)

(52) U.S. Cl.
CPC ............... *H04L 63/08* (2013.01); *H04L 9/32* (2013.01); *H04L 9/3215* (2013.01); *H04L 63/0807* (2013.01); *H04L 63/18* (2013.01); *H04W 4/14* (2013.01); *H04W 12/06* (2013.01); *H04L 63/0428* (2013.01); *H04L 2209/80* (2013.01); *H04L 2463/082* (2013.01)

(58) Field of Classification Search
CPC ..... H04L 63/08; H04L 63/18; H04L 63/0807; H04L 9/3215; H04L 9/32; H04L 2463/082; H04L 2209/80; H04L 63/0428; H04W 12/06; H04W 4/14
See application file for complete search history.

(56) References Cited

U.S. PATENT DOCUMENTS

| | | | | |
|---|---|---|---|---|
| 7,729,989 | B1 * | 6/2010 | Yuen .................. | G06Q 20/12 705/44 |
| 9,197,638 | B1 * | 11/2015 | Livesay ............. | H04L 63/0861 |
| 9,215,572 | B1 * | 12/2015 | Gailloux ............ | H04W 4/14 |
| 2004/0058694 | A1 * | 3/2004 | Mendiola .......... | G06Q 30/02 455/466 |
| 2004/0209597 | A1 * | 10/2004 | Myles ................ | H04L 63/101 455/410 |
| 2007/0094150 | A1 * | 4/2007 | Yuen .................. | G06Q 20/02 705/64 |
| 2007/0178883 | A1 * | 8/2007 | Nandagopal ....... | G06Q 20/32 455/411 |
| 2009/0037982 | A1 * | 2/2009 | Wentker ............ | H04L 63/083 726/3 |
| 2009/0124270 | A1 * | 5/2009 | Kelley ............... | H04L 63/0407 455/466 |
| 2010/0088753 | A1 * | 4/2010 | Ayres ................ | G06F 21/41 726/9 |

(Continued)

*Primary Examiner* — John B King
(74) *Attorney, Agent, or Firm* — Aventum IP Law LLP

(57) ABSTRACT

A first server receives a text message addressed to a first text destination and including authentication information The first server establishes a secure connection between the first server and a first mobile device associated with a first user, one of the first user and the first mobile device associated with the first text destination. The authentication information is then provided from the first server to the first mobile device via the secure connection.

17 Claims, 7 Drawing Sheets

(56) References Cited

U.S. PATENT DOCUMENTS

| | | | |
|---|---|---|---|
| 2011/0039584 A1* | 2/2011 | Merrett | H04L 51/36 |
| | | | 455/466 |
| 2011/0252104 A1* | 10/2011 | Nachum | H04L 51/12 |
| | | | 709/206 |
| 2012/0116967 A1* | 5/2012 | Klein | G06Q 20/108 |
| | | | 705/42 |
| 2012/0136796 A1* | 5/2012 | Hammad | G06Q 20/12 |
| | | | 705/67 |
| 2013/0095797 A1* | 4/2013 | Paz | H04L 29/12905 |
| | | | 455/411 |
| 2015/0339745 A1* | 11/2015 | Peter | G06F 16/9558 |
| | | | 705/26.42 |
| 2016/0321245 A1* | 11/2016 | Chisholm | G06F 17/289 |
| 2017/0180378 A1* | 6/2017 | Tyler | H04L 63/1433 |
| 2018/0241878 A1* | 8/2018 | Jack | H04W 4/14 |
| 2019/0035190 A1* | 1/2019 | Szczygiel | G07C 9/00309 |
| 2019/0037071 A1* | 1/2019 | Singh | H04L 63/0876 |

\* cited by examiner

METHOD AND SYSTEM FOR USER VERIFICATION

FIELD OF THE INVENTION

The invention relates to computer security and more particularly to remote authentication of users.

BACKGROUND

Many websites rely on single factor authentication. A user, to access the website, enters their username and password. The password is compared to a password for the username and when correlated the user is provided access. That said, in higher security applications, two factor authentication is often used wherein a physical device provides a data value additional to the password in order to validate access. The physical device is secure and provides a rolling value such that each access attempt receives a different value. Alternatively, the value provided is in response to a challenge where a user enters data into the device and receives a response to enter into the second factor identification field.

Recently, it has become apparent that personal information can be used as a second factor. As such, some websites allow a user to authenticate with a mobile phone number. The mobile phone number correlates to an SMS destination and a message is sent to the SMS destination. Either the user then enters the message content or a portion thereof, or the user responds to the message in order to indicate that it was received.

It would be advantageous to provide a convenient and secure second factor authentication.

SUMMARY OF EMBODIMENTS OF THE INVENTION

In accordance with embodiments of the invention there is provided a method comprising: receiving at a first server a text message addressed to a first text destination and including authentication information; establishing a secure connection between the first server and a first mobile device associated with a first user, one of the first user and the first mobile device associated with the first text destination; and providing via the secure connection the authentication information from the first server to the first mobile device.

In accordance with embodiments of the invention there is provided a method comprising: receiving at a first server a text message addressed to a first text destination and including authentication data; modifying the authentication data to provide modified authentication data; and transmitting the modified authentication data via text message from the first server to a first mobile device associated with a first user, one of the first user and the first mobile device associated with the first text destination.

In accordance with embodiments of the invention there is provided a method comprising: registering a first user in a data base; associating with the first user a unique destination address, the unique destination address for addressing authentication data; associating with the first user a first text message destination for directing text messages to a first server in communication with the database, the first text message destination other than provided by the first user; and providing to the first user the first text message destination.

In accordance with embodiments of the invention there is provided a method comprising: registering by a first user a first phone number with a security service; receiving from the security service a second phone number for use in accessing the security service, the second phone number other than provided by the first user; storing within a database in association one with another the first phone number and the second phone number; in response to a security authorization contact information request, providing the second phone number; receiving at the server a security authorization request associated with the phone number; looking up the first phone number based on the associated second phone number; and communicating with the second phone number verification information for use in an authentication process.

In accordance with embodiments of the invention there is provided a method of supporting multichannel authentication comprising: providing a user authentication window for authenticating a first user; receiving at the user authentication window a user identifier; transmitting from a server to a first text message destination associated with the first user an authentication code, the first text message destination uniquely directing the authentication code to a second other server; receiving at the second other server the authentication code associated with the first text message destination; at the second server, determining a second text message destination associated with the first text message destination and transmitting the authentication code to the second text message destination to the first user; and using the authentication code by the first user to authenticate with the authentication window.

In accordance with embodiments of the invention there is provided a method comprising: receiving at a first server address data for directing data to an end user, the address data directing communication to a security server and containing further data for identifying the end user, the further data other than indicative of the end user absent further data from the security server; directing authentication data from the first server to the security server for being communicated to the end user; setting up a secure channel between the security service and the end user to transmit data therebetween; and transmitting the authentication data to the end user via the secure channel.

BRIEF DESCRIPTION OF THE DRAWINGS

Exemplary embodiments of the invention will now be described in conjunction with the following drawings, wherein similar reference numerals denote similar elements throughout the several views, in which.

DETAILED DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Figure 1:
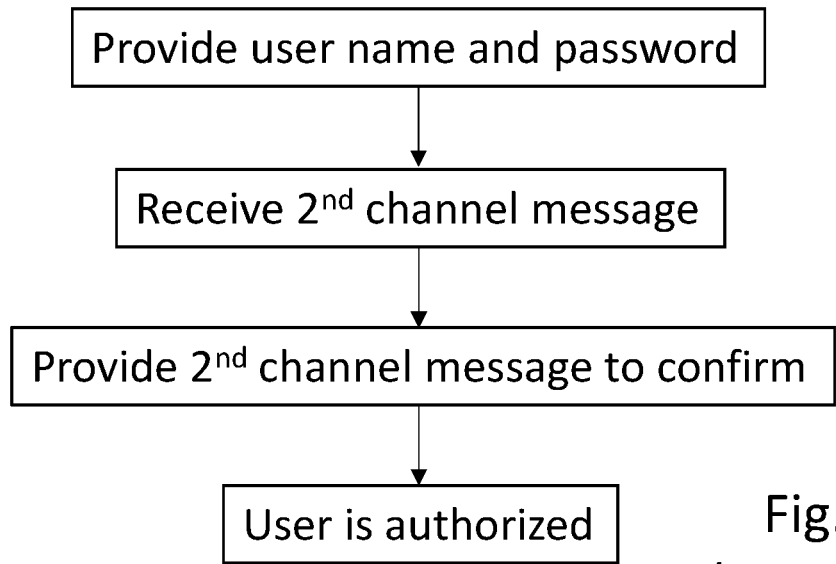
FIG. 1 is a simplified flow diagram of a prior art method of two-channel authentication.

Referring to FIG. 1, shown is simplified flow diagram of a prior art method of two-factor authentication. A user provides a username and a password to a security window. The username is associated with a destination address. The destination address is provided with a message and the user, upon receiving the message, enters data from the message into the security window and, when the three data fields are provided with correlated data, the user is authenticated and accesses the web site or service.

Unfortunately, someone with knowledge of a destination address can potentially perform a man in the middle attack to access the web site or service in place of a rightful user. The man in the middle attack would set up a fake site to accept the username and password. It would pass these onto the real site. When the user receives the message, the code is entered and now the man in the middle has access to the system. For example, the man in the middle may have access to banking information, personal information, etc. With additional knowledge of the destination address, the man in the middle could also intercept messages bound for that address and could then continue to access the real site Further, in security applications the use of a fixed address that is stored on the system to be accessed is considered problematic because it gives ample time and opportunity to breach security of same.

Figure 2:
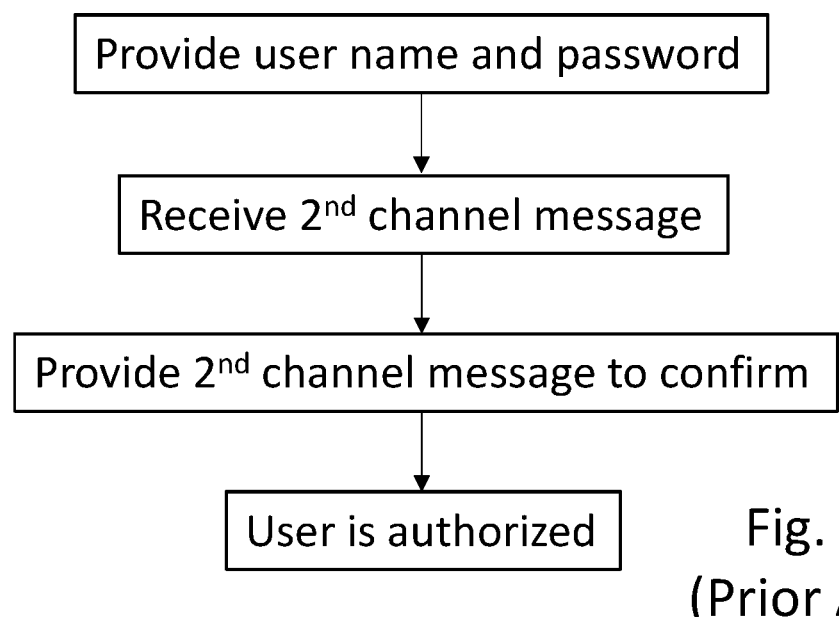
FIG. 2 is a simplified flow diagram of another prior art method of two-channel authentication.

Referring to FIG. 2, shown is simplified flow diagram of another method of two-factor authentication. A user provides a username, a password, and a destination address in the form of their mobile phone number—their SMS address—to a security window. To the destination address is transmitted a message and the user, upon receiving the message, enters data from the message into the security window and, when the user security data is correct, the user is authenticated and accesses the web site or service.

Unfortunately, someone with knowledge of a user's mobile phone number can potentially perform a man in the middle attack allowing them access to the web site or service in place of the rightful user. Even though the mobile number is not stored on the server, it is constant and, as such, is a fixed security datum, which can be problematic.

Figure 3:
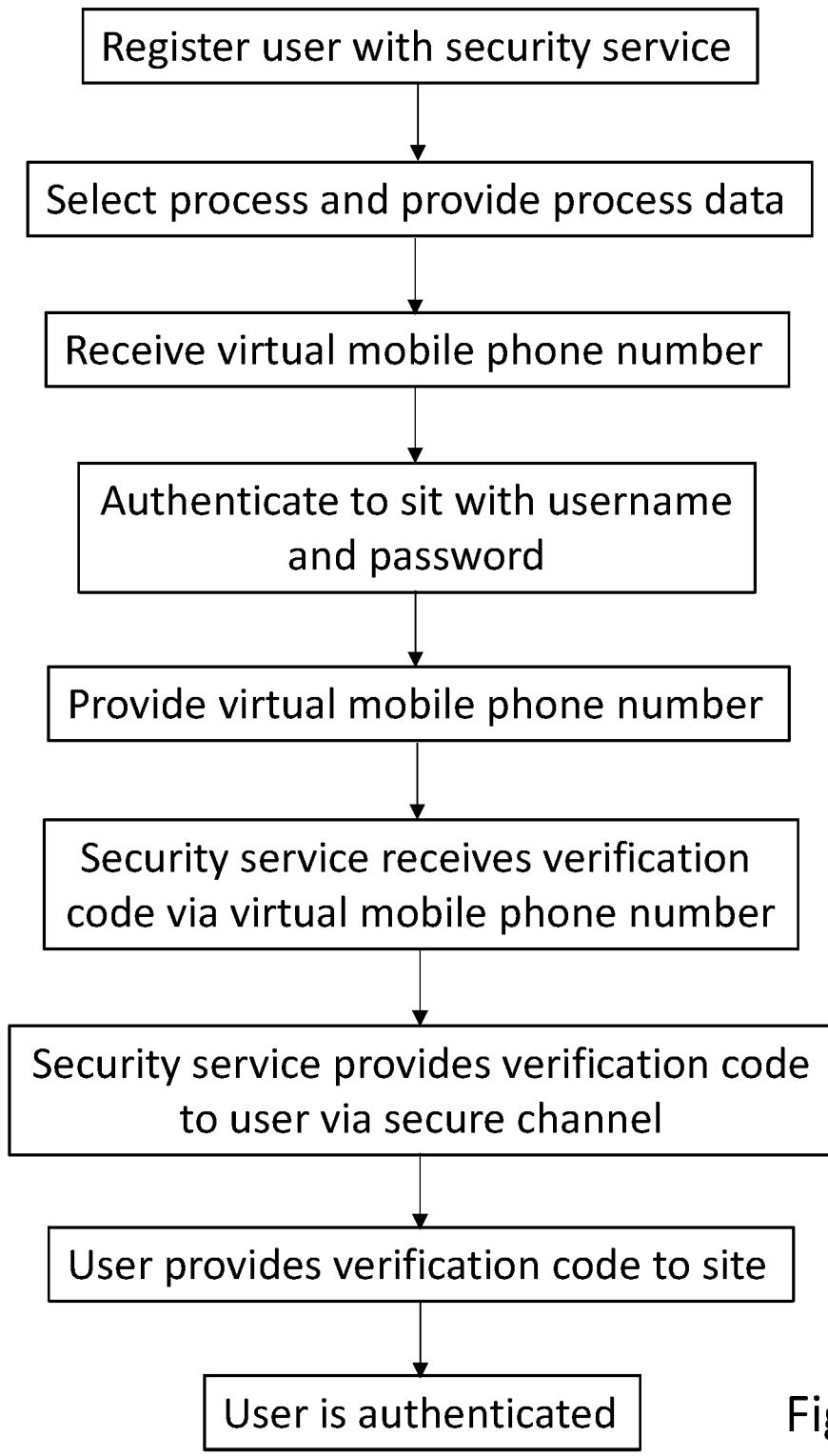
FIG. 3 is a simplified flow diagram of a new method of two-channel authentication.

Referring to FIG. 3, shown is a flow diagram of another two-factor authentication process. A user registers with a security server for a security service. The user selects a second factor authentication process and provides address data relating thereto. The server provides the user with a virtual mobile phone number or another virtual SMS address for the user's benefit. The server associates the virtual mobile phone number and the user. The virtual mobile phone number does not belong to a mobile phone but is associated by the security server with the user.

The user navigates to a security window. The security window requests a username, password, and a mobile phone number. The user provides the virtual mobile phone number to the security window and the security process transmits a message to the destination based on the virtual mobile phone number.

The security server is disposed for receiving messages bound for virtual mobile phone numbers associated therewith. The messages bound for those virtual mobile phone numbers terminate at the server. Then, in accordance with the two-factor authentication process and using the data within the received message, the server performs second factor authentication with the user. For example, the user is provided data to provide to the security window via their real mobile phone number or via a push notification. Because the message to the user is provided via a security process, security features are optionally implemented along a communication path from the security server to the mobile phone of the user. Because the virtual mobile phone number is only associated with the user within the security server, the virtual mobile phone number is modifiable when breached, at intervals, when indicated or initiated by the user or when indicated or initiated by the security server.

Figure 4:
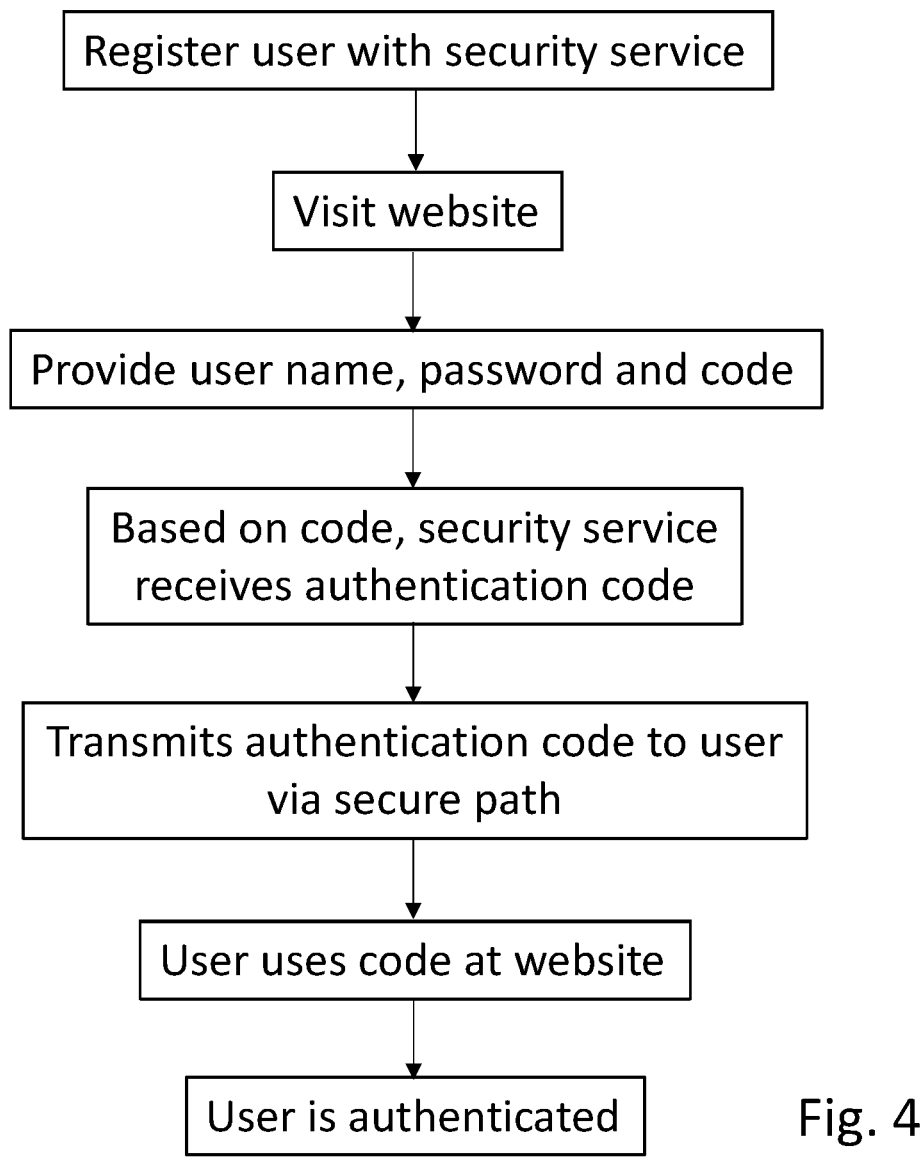
FIG. 4 is a simplified flow diagram of another method of two-channel authentication.

Referring to FIG. 4, shown is a flow diagram of another two-factor authentication process. A user accesses a security service provider. The user is directed to a security server in communication with a wide area network in the form of the Internet. The user registers with the security server for the security service. The user then navigates to a security window for providing and receiving information. The security window typically requests a username, password, and a mobile phone number. The user provides a code in the form of a one time password to the security window, the code indicative of at least one of the user and the security service and the security process requests from the security service a second factor authentication communication path. The security service then transmits a message to the destination based on a user identifier and the security window.

In accordance with the two-factor authentication process and using the data within the received message, the security service performs second factor authentication with the user. For example, the user is provided data to provide to the security window via their real mobile phone number or via a push notification. Because the message to the user is provided via the security process, enhanced security features are optionally implemented along a communication path from the security server to the mobile phone of the user. Similarly, because the second factor authentication communication path is only associated with the user within the security server, the second factor authentication communication path is modifiable when breached, at intervals, or when indicated or initiated by the user. Examples of second factor authentication communication path include mobile phone numbers, push notifications, email addresses, user ID, or reference codes. In some embodiments the second factor authentication communication path terminates twice, once at the security service and once at the user. In other embodiments, the second factor authentication communication path terminates only once at the user. In yet further embodiments, the second factor authentication communication path terminates differently different times. Alternatively, second factor authentication communication path includes a third factor communication path as well. Of course, fourth factor authentication paths, etc. are also supported. In some embodiments the number of authentication paths is varied, for example in response to a security level or value of a transaction. In other embodiments, the number of authentication paths remain fixed.

Optionally, the second factor identification is provided back to the security service and from there back to the security window providing complete isolation between the security window and the user along the second authentication path.

Figure 5:
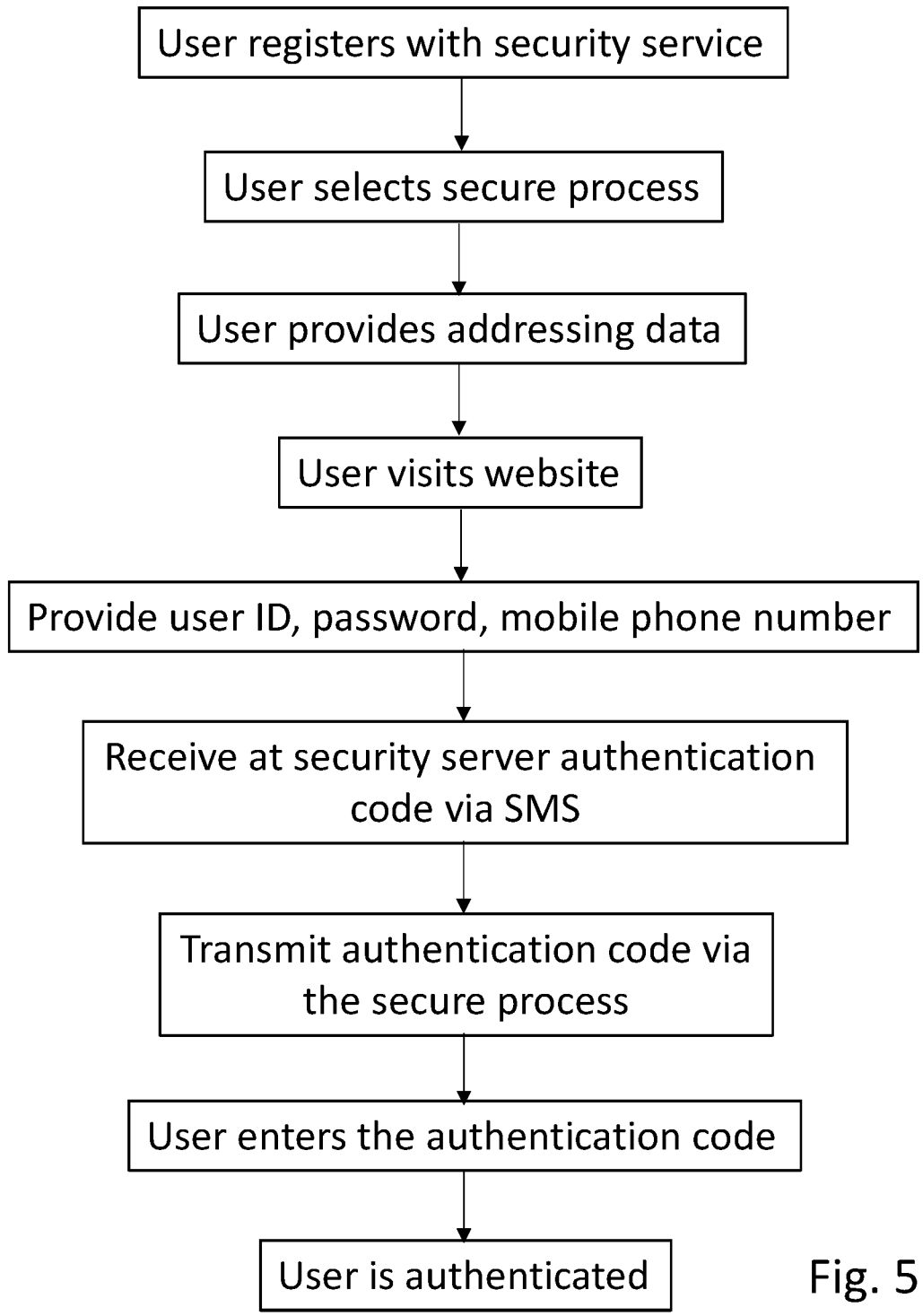
FIG. 5 is a simplified flow diagram of another method of two-channel authentication wherein a user selects a security process for communication therewith.

Referring to FIG. 5, shown is a flow diagram of another two-factor authentication process. A user accesses a security service provider. The user is directed to a security server in communication with a wide area network in the form of the Internet. The user registers with the security server for the security service. The user selects a second factor authentication process and provides address data relating thereto. The server provides the user with an account for accessing virtual mobile phone numbers for the user's benefit. The virtual mobile phone numbers do not belong to a mobile phone but are associated by the security server with the user. For example, the server sets aside for the user all mobile phone numbers (CCC) CCC-Cxxx, where C is a constant and x is variable. This would amount to 1000 mobile phone numbers.

The user navigates to a security window. The security window requests a username, password, and a mobile phone number. The user accesses the security server and is provided a one-time use virtual mobile phone number (CCC) CCC-C000. The user then provides the one time use virtual mobile phone number to the security window and the security process transmits a message to the destination based on the one time use virtual mobile phone number to a security service associated with the security server.

The security service receives messages bound for the virtual mobile phone numbers. Then, in accordance with the two-factor authentication process and using the data within the received message the security service performs second factor authentication with the user. For example, the user is provided data to provide to the security window via their real mobile phone number or via a push notification. Because the message to the user is provided via a security process, security features are optionally implemented along a communication path from the security server to the mobile phone of the user. Similarly, because the virtual mobile phone number is only associated with the user within the security server, the virtual mobile phone number is modifiable by incrementing same when breached, at intervals, or when indicated or initiated by the user. Of course, a new virtual mobile number could be randomly generated or could be predetermined in accordance with an obfuscation algorithm.

Figure 6:
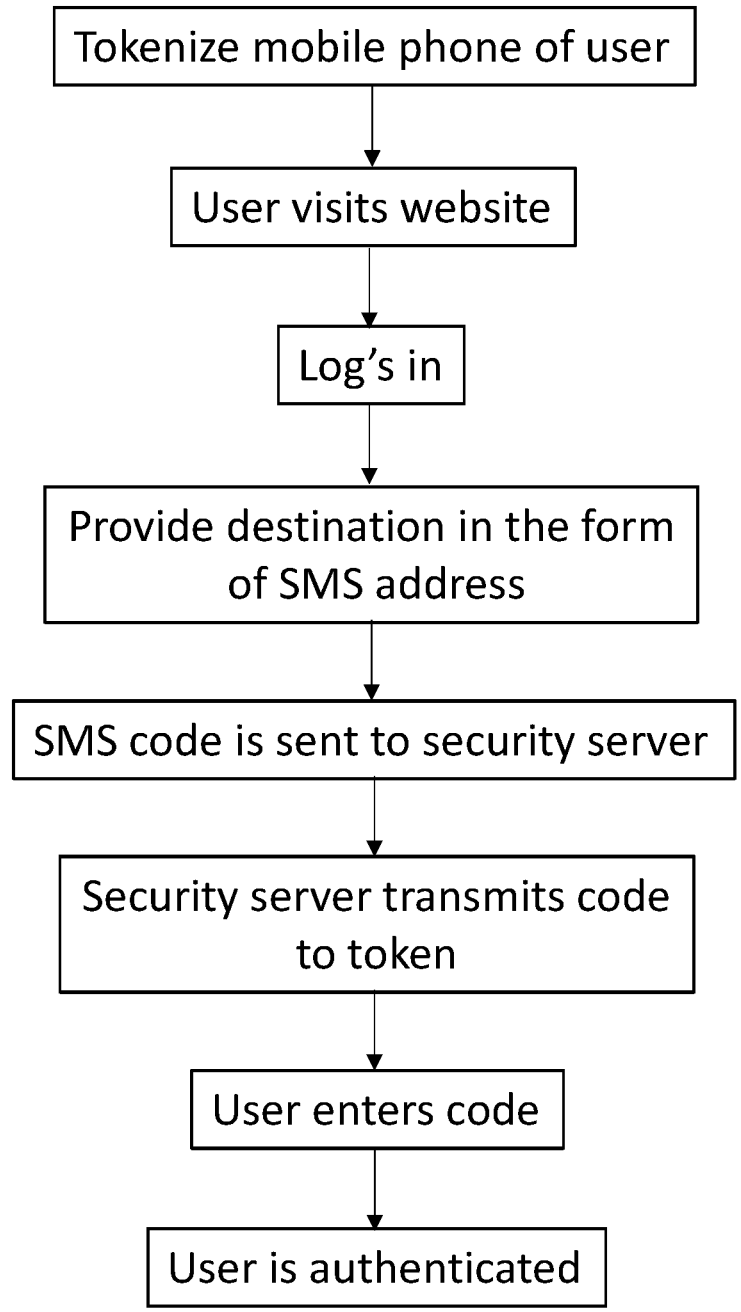
FIG. 6 is a simplified flow diagram of another method of two-channel authentication wherein a mobile phone of a user is tokenized.

The security service in the above embodiments allows for obfuscation of the user's mobile telephone number, which the user does not want to change. The security service allows the user to change their mobile phone number, maintain the mobile phone number confidential, and to use alternative secure communication channels. Further, as the user expect security messages from the security server, even those who know the users mobile phone number cannot easily spoof the system as the messages would arrive from a source other than the security service. In the embodiment shown in the flow diagram of FIG. 6, the security service tokenizes the mobile phone of the user to form a unique and identifiable communication endpoint. For example, the phone is provided with a security token that is unique to the phone in the form of an encryption key or a portion thereof. The mobile phone is then uniquely identified by the security server prior to providing second channel information thereto. Thus, only the single known device is able to receive security information via the second channel. Further, at any point the phone can be re-tokenised if desired or necessary. If the user loses their phone, their new phone will need to be tokenized as the previous certification is not transferable. Thus, the resulting single device forms a unique endpoint for security communication; the unique endpoint is modifiable via the security service as is the communication path to the security service.

Figure 7:
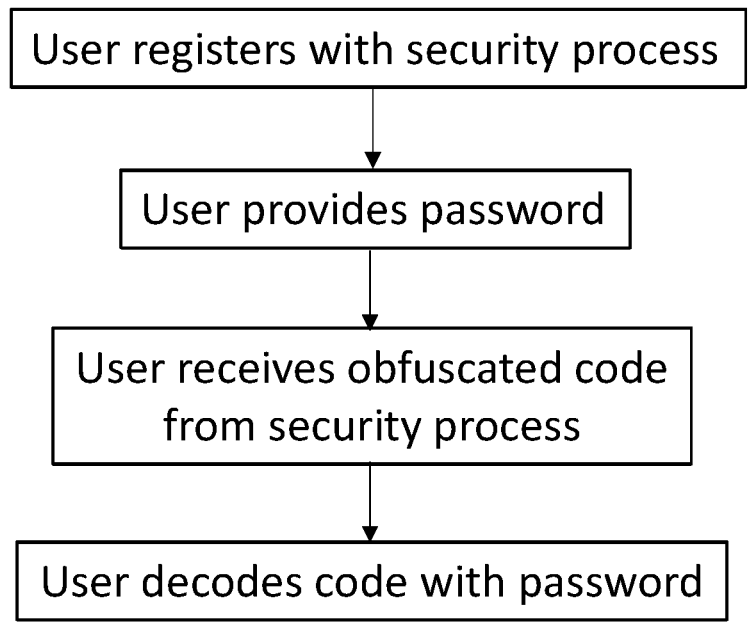
FIG. 7 is a simplified flow diagram of another method of two-channel authentication wherein a security server obfuscates the authentication code.

In another embodiment, shown in the flow diagram of FIG. 7, the user creates a security process such that data transmitted to the user along the second channel is secured for the user's unique consumption. For example, the user selects a predetermined password that is required to decode the message. This allows for the use of regular SMS messaging for supporting the second channel without modifying the security window or web site and maintaining security as the password is optionally changed at intervals and the user will maintain the password for decoding of their two-channel authentication data. In some embodiments, the password is used with another process or application wherein the received data is cut and paste into another application and the code results. In some embodiments the password is provided to the application one time during setup. In other embodiments, the password is needed each time the application is used.

Of course, the same process is applicable when the second channel carries destination authentication data, such as data for the user to verify before logging in to make sure they are at the right server. As a spoof server would not know the password, it could not modify the destination authentication data to make it correct for being verified and accepted by the user. In some embodiments, the user uses a separate software application, in the form of an app, to decode a message received from the security server. The app is optionally set up to function having the password entered only one time. Alternatively, it prompts the user for the password each time. Further alternatively, it relies on biometrics or another security data input value.

Figure 8:
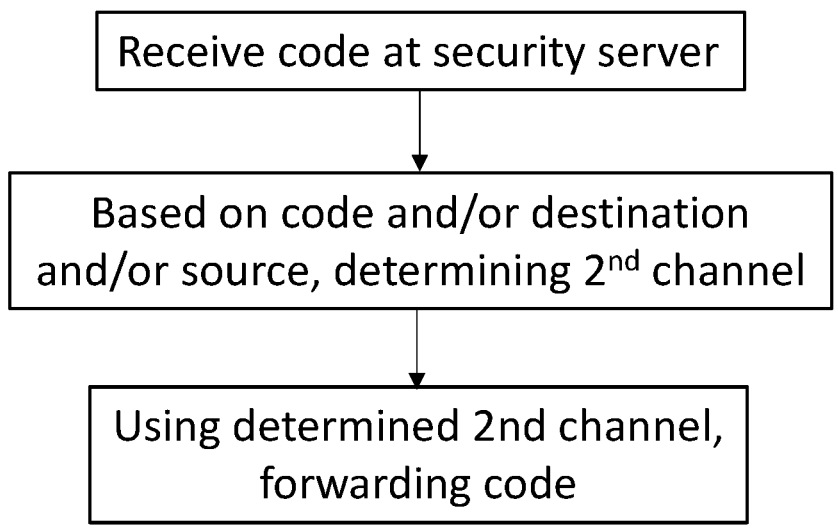
FIG. 8 is a simplified flow diagram of another method of two-channel authentication wherein the authentication code is rerouted based on at least one of the authentication code, the source of the authentication code and the address to which the authentication code was transmitted.

Referring to FIG. 8, shown is a flow diagram of a method for message re-routing by a security service in association with the security server. Here, a second channel authentication information message is received from a source at the security service and bound for a user. The security service uses the second channel information message to look up a route to the user based on the source and the user. Thus, personal accounts are routed to the user's personal mobile device and work accounts are routed to the user's work account. In some embodiments, this allows for rerouting of the user's work related message when the user leaves their position of employment, routing of messages having different security concerns to different end points and logging and managing of security access attempts for enterprise applications separately from access attempts to personal or private data. Thus, if John is terminated from his employment, an employer can change the verification destination for his work accounts and thereby terminate his automatic access to his work related accounts. Even access to his work phone, etc. can be terminated if two-channel authentication is required to access those. Further, and equally importantly, when John is ill or on leave he can provide his replacement access to all of his work related accounts with the password or deny access by not sharing the password. Thus, his privacy is maintained while increasing overall security and without significant expense of convenience.

In some embodiments, the security service verifies or authorizes the security window to manage sites that can be registered or accepted by the user; for example, a workplace can restrict access to certain sites from relying on the security service.

Figure 9:
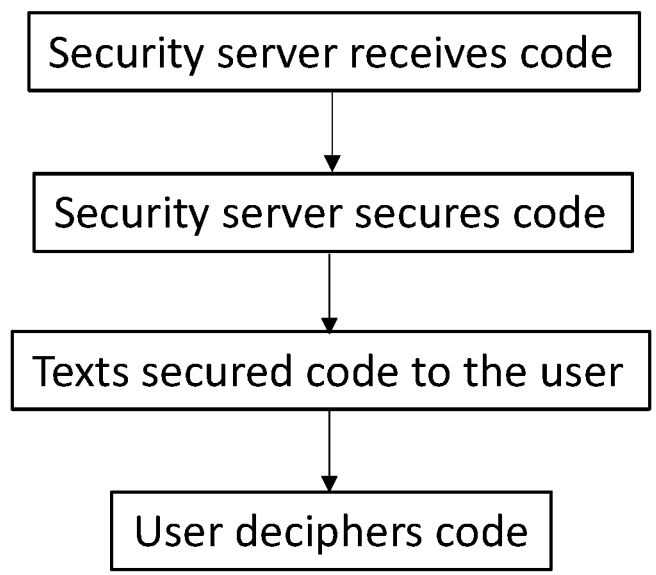
FIG. 9 is a simplified flow diagram of another method of two-channel authentication wherein the authentication code is ciphered prior to being transmitted via SMS to the user.

Referring to FIG. 9, shown is a flow diagram of another two-factor authentication process. A user accesses a security service provider. The user is directed to a security server in communication with a wide area network in the form of the Internet. The user registers with the security server to receive security services. The user selects a second factor authentication process and provides address data relating thereto.

The user navigates to a security window. The security window requests a username, password, and a mobile phone number. The user enters data relating to a selected security server. The user provides identification data for identifying the security server to the security window and the security process transmits a message to the security server and receives therefrom second channel data to provide to the user. The second channel data is based on the message content and a process in execution on the server and associated with the user. For example, the message is encoded based on another user password. The security window transmits the second channel data to the user via an SMS address or another communication channel, for example displaying it on the screen.

The user then verifies the second channel data by decoding same and providing the decoded message back to the security window in order to complete the two-channel authentication process. Optionally, the message is not encoded when shown to the user and the user merely repeats the message to the security window.

Though the above embodiments are described with relation to a single user and a single security window, the method is applicable to a security server supporting a plurality of users each having associated therewith a destination and a plurality of security access interfaces, each for accessing an electronic or other resource. The method supports WebSites such as Amazon.com®, which if provided a mobile number directed toward the security server or service would transmit second channel authentication data thereto without modification to the Amazon.com® WebSite and, as such, is backward compatible with current two-channel authentication methodologies.

Though the above embodiments relate to two-factor authentication, they apply equally to multifactor authentication.

Though the above embodiments are described as backward compatible with existing two factor authentication, by updating specific World Wide Web sites, a given SMS address or mobile phone number is trapped and identified as the security server allowing for communication with the security server via a secure process separate from a legacy process that would have used the SMS address or mobile phone number. For example all numbers beginning in (CCC) CCx-xxxx are known to be part of the security service and, as such are identified by Web sites allowing for a separate security protocol to be initiated, for example employing a secure communication path to the security service and the mobile number provided for user identification instead of the relying on the public phone network for communication.

Alternatively, when one of the two legs of the communication path is known to be secure, an unsecured second path is relied upon. This allows an SMS message to push notification process, an SMS message to an SMS message, a virtual SMS to an SMS message, a virtual SMS to a push message, and others.

Alternatively, a user ID is used instead of the SMS to allow for SMS lookup or exchange. A user ID is used to retrieve a communication destination for a message from, for example, a security server or an internal database.

Alternatively, mobile devices are used for data entry such that a mobile device provides the destination address to a login window or, alternatively, provides a code thereto for use in the second channel process.

In another embodiment, a user is requested to authenticate themselves before receiving or viewing the code provided via the second channel. In some embodiments, a code includes data on whether a user is to be requested to authenticate themselves before receiving or viewing the code provided via the second channel.

Numerous other embodiments may be envisaged with out departing from the scope of the invention

What is claimed is:
1. A method comprising:
receiving at a first server a text message addressed to a first text destination and including authentication information;
providing a dataset for correlating text destinations, authentication information, and mobile devices;
searching the dataset for a first mobile device associated with the first text destination and the received authentication information in response to receiving the text message;
establishing a secure connection between the first server and the first mobile device associated with a first user, one of the first user and the first mobile device associated with the first text destination;
providing via the secure connection the authentication information from the first server to the first mobile device;
receiving a second text message containing second authentication information and addressed to the first text destination, wherein the text message and the second text message are SMS text messages;
searching the dataset for a second mobile device associated with the first text destination and the second authentication information in response to receiving the second text message, wherein the first mobile device and the second mobile device are different;
establishing a second secure connection between the first server and the second mobile device associated with the first user; and
transmitting the second authentication information to the second mobile device over the secure connection.

2. The method according to claim 1, wherein the first text destination is uniquely directed to the first server.

3. The method according to claim 2, wherein the secure connection is uniquely between the first mobile device and the first server.

4. The method according to claim 1, further comprising: tokenizing the first mobile device to form a first secure token; and forming the secure connection in dependence upon the first secure token.

5. The method according to claim 4, further comprising: tokenizing the second mobile device associated with the first user; and registering the second mobile device with the server to associate uniquely the first text destination with the second mobile device.

6. The method according to claim 1, further comprising: providing a second dataset for correlating text destinations, text sources and mobile device.

7. The method according to claim 6, further comprising: receiving a third text message containing third authentication information, from a third text source and addressed to the first text destination; searching the second dataset for a third mobile device associated with the first text destination and the third text source in response to receiving the third text message.

8. The method according to claim 7, further comprising: transmitting the third authentication information to the third mobile device.

9. A method comprising:
registering a first user in a dataset, the dataset for correlating text destinations, authentication data, and mobile devices;
associating with the first user a first text message destination for directing text messages to a first server in communication with the dataset;
providing to the first user the first text message destination;
receiving at the first server a text message addressed to the first text message destination and including first authentication information;
searching the dataset for a first mobile device associated with the first text destination and the received first authentication information in response to receiving the text message;
establishing a secure connection between the first server and the first mobile device associated with the first user;
providing via the secure connection the first authentication information from the first server to the first mobile device;
receiving a second text message containing second authentication information and addressed to the first text destination, wherein the text message and the second text message are SMS text messages;
searching the dataset for a second mobile device associated with the first text destination and the second authentication information in response to receiving the second text message, wherein the first mobile device and the second mobile device are different;
establishing a second secure connection between the first server and the second mobile device associated with the first user; and
transmitting the second authentication information to the second mobile device over the secure connection.

10. The method according to claim 9, further comprising: modifying the dataset to associate a third mobile device with the first user.

11. The method according to claim 9, further comprising: modifying the dataset to associate a second other user with the first mobile device.

12. The method according to claim 9, further comprising: changing association data associated with the first user by their employer, wherein the first user is registered in the dataset by their employer.

13. The method according to claim 12, wherein the association data is changed to associate a second other user with the first text destination.

14. The method according to claim 9, further comprising: storing within the dataset data for associating with the first user a third mobile device in place of the first mobile device.

15. The method according to claim 9, further comprising: storing within the dataset data for associating with the first user a third mobile device as well as the first mobile device and the second mobile device and for directing text messages received at the first server uniquely to one of the first mobile device, the second mobile device, and the third mobile device.

16. The method according to claim 15, wherein the data for directing text messages received at the first server comprises a source of the text messages.

17. The method according to claim 15, wherein the data for directing text messages received at the first server comprises a content of the text messages.

* * * * *